United States Patent [19]

Nishiuchi et al.

[11] Patent Number: 4,908,835
[45] Date of Patent: Mar. 13, 1990

[54] INFORMATION RECORDING MEDIUM

[75] Inventors: Kenichi Nishiuchi, Moriquchi; Nobuo Akahira, Yawata; Noboru Yamada, Hirakata; Eiji Ohno, Neyagawa, all of Japan

[73] Assignee: Matsushita Electric Industrial Co., Ltd., Kadoma, Japan

[21] Appl. No.: 373,666

[22] Filed: Jun. 29, 1989

Related U.S. Application Data

[60] Continuation of Ser. No. 924,157, Oct. 27, 1986, abandoned, which is a division of Ser. No. 755,653, Jul. 16, 1985, abandoned.

[30] Foreign Application Priority Data

Jul. 18, 1984 [JP] Japan .................. 59-148801

[51] Int. Cl.[4] .................................. G01N 25/00
[52] U.S. Cl. ........................ 374/45; 374/17; 374/20
[58] Field of Search .................. 374/16–20, 374/57, 160–162, 45; 116/216

[56] References Cited

U.S. PATENT DOCUMENTS

| | | | |
|---|---|---|---|
| 2,669,863 | 2/1954 | Shapiro | 374/17 |
| 4,278,734 | 7/1981 | Ohta et al. | 428/432 |
| 4,461,807 | 7/1984 | Mori et al. | 428/469 |

FOREIGN PATENT DOCUMENTS

| | | | |
|---|---|---|---|
| 104076 | 8/1981 | Japan | 374/16 |
| 56-145530 | 11/1981 | Japan . | |
| 5164EO01 | 4/1984 | Japan . | |
| 185048 | 10/1984 | Japan . | |
| 60-212842 | 10/1985 | Japan . | |

OTHER PUBLICATIONS

S.V. Biryukov, "Device for Automatic Melting-Point Determination for Crystalline SUbstances", *Instrum. and Exp. Tech*, vol. 24, no. 4, Feb. 1982 pp. 1088–1091.

Takenaga, et al., J. Appl. Phys. 54(9), Sep. 1983, pp. 5376–5379; TeO$_x$ Thin Films for an Optical DIsc Memory.

*Primary Examiner*—William A. Cuchlinski, Jr.
*Assistant Examiner*—W. Morris Worth
*Attorney, Agent, or Firm*—Cushman, Darby & Cushman

[57] ABSTRACT

A method of measuring reliability of an information recording medium which comprises an information recording thin film. The method comprises the steps of heating said film at least once to its melting point, rapidly cooling said film after heating, measuring a transition temperature of said film after cooling, and comparing said transition temperature with a predetermined reference temperature.

4 Claims, 6 Drawing Sheets

INFORMATION RECORDING MEDIUM

This is a continuation of Application No. 06/924,157, filed October 27, 1986, which was abandoned upon the filing hereof, and which was itself a divisional of Application No. 755,653 filed July 16, 1985 and now abandoned.

BACKGROUND OF THE INVENTION

1. Field of the Invention

The present invention relates generally to an information recording medium, and more particularly, to an information recording medium having an information recording thin film whereon information can be erasably recorded.

2. Description of the Prior Art

An optical information recording medium records information by changing the optical state or minute surface shape of a thin film formed on a substrate. The changes are made by focusing laser light on the surface of the thin film in order to raise the temperature of the selected parts of the surface.

A non-erasable optical disc which uses a thin film of a metal or a thin film containing a low oxide of a metal as the host material has been reported in J. Appl. Phys., Vol. 54, No. 9, September, 1983. According to this report, information is recorded by utilizing the increase in optical density in the portion irradiated by a laser light to raise the temperature on a thin film formed by vapor evaporation on a substrate. The reliability of such an information recording thin film, especially in the case of leaving it in a high temperature atmosphere, has a high correlation with the thermal transition temperature of thin information recording film. The transition temperature is defined as follows. The optical state of the information recording thin film changes at a specified temperature when the information recording film is heated gradually from a low temperature to a high temperature. The lowest of the particular temperatures at which the above-mentioned change in optical state takes place is defined as the transition temperature of the information recording thin film. To measure the transition temperature, a low power laser light beam is irradiated on the information recording thin film and the temperature of the film is gradually raised at a constant rate while observing the transmitted light and reflected light at the same time (Japanese Patent Application Sho 59-70229). The temperature of various information recording thin films are measured by using this prior art method of measurement, adn then a reliability test is also performed, and the experiments show that the information recording thin films having a transition temperature of above 120° C. did not deteriorate even when left alone for several months in a high temperature atmosphere of 50° C.

Another conventional information recording thin film comprises $TeO_x$ ($0 < x < 2$) as the host material and further contains Sn, In, Ge, Bi or Se as an additive. This information recording thin film is known to have the property of reversibly changing its optical state depending on the condition of the irradiation of the laser lights, as disclosed in the Japanese Unexamined Published Patent Application Sho 56-145530 and Japanese Patent Application Sho 58-58158). When a pulse light of relatively short duration is irradiated on the thin film, the temperature of the irradiated portion rises once and then quickly drops, thereby decreasing the optical constants of the irradiated portion. This is defined as whitening. In contrast, when the thin film is irradiated by a relatively low power pulse light of long duration, the irradiated portion is heated once to a higher temperature and then gradually cooled, thereby increasing the optical constants. This is defined as darkening. This type of information recording media is used by utilizing the above-described whitening and darkening phenomena so that writing and erasing are repeatedly carried out. That is, erasable recording is possible, and application of the whitening and darkening phenomena to optical information recording discs is being developed.

When the above-described phenomena are applied to an optical information recording disc, it has been shown experimentally that whitening (i.e., decreasing the optical constants) is done in a shorter time period than is darkening (i.e., increasing the optical constants). As a result, in the actual recording of signals, whitening is used to record the signal, in order to attain a higher recording rate and recording density, while darkening is preferably used to erase the signal. Accordingly, in an information recording disc having the above-described thin film, the thin film must be preliminarily set in the darkened state, that is, the state having larger optical constants, prior to the recording of signals.

Hereinafter, when the information recording thin film is in a virgin state, that is, when no heat treatment or the like has yet been carried out thereon, that state will be defined as the initial state, and the above-mentioned states of high optical constants and low optical constants will be defined as the darkened state and the whitened state.

The inventors carried out assessment tests of reliability under a high temperature atmosphere for recording media having erasable information recording thin film. The assessment shows that reliabilities in the initial state are substantially the same for various transition temperatures. However, the experimental assessment tests show that with regard to the recorded portion, i.e., the portion in the whitened state, reliability has no particular correlation with respect to the transition temperature; that is, even though the transition temperatures are the same, reliabilities vary depending on the composition of the thin film and elements added thereto. In other words, in the whitened state, reliability becomes unsatisfactory, even though the transition temperature is sufficiently high.

SUMMARY OF THE INVENTION

The purpose of the present invention is to provide an erasable optical information recording medium having a high reliability in the recorded state of the information recording thin film even in severe conditions of use.

The information recording medium in accordance with the present invention comprises:

a substrate, and an information recording thin film which is formed at least on one face of the substrate and is of a substance which shows a higher optical density when it is heated substantially to its melting point and thereafter slowly cooled and a lower optical density when it is heated substantially to its melting point and thereafter is rapidly cooled, the transition temperature of the optical state of the substance being above 100° C.

Based on the inventors' finding that the transition temperature in the recorded state (the whitened state) is different from the transition temperature of the initial state of the thin film, and the transition temperature of the whitened portion has a close correlation with the stability of the whitened portion. That is, under ordinary conditions of use, the transition temperature of the whitened portion is preferably 100° C, but in a more severe environment of use, the transition temperature must be above 120°.

DESCRIPTION OF THE PREFERRED EMBODIMENTS

Figure 1:
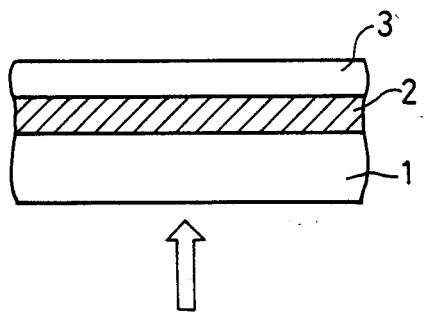
FIG. 1 is a sectional view showing one embodiment of an optical information recording medium in accordance with the present invention.

Hereinafter, a detailed description of an embodiment of the present invention is described with reference to the accompanying drawings. FIG. 1 shows a cross-section of an information recording medium in accordance with the present invention. A substrate 1 is, for instance, a metal, e.g. Al, Cu; or a glass, e.g. quartz glass, pyrex or soda glass; a resin, e.g. ABS-resin, polystyrene, acrylic resin or vinyl chloride; or a transparent film of acetate, teflon or polyester. The substrate, especially the polyester film and the acrylic film, are excellent in their effectiveness in optically reproducing the recorded information due to their very good transparency. The recording thin film 2 is formed on the substrate 1 by means of a vacuum evaporation method. The recording thin film 2 is made of at least one of an oxide of a first metal or a first semimetal, such as $TeO_x$, $GeO_x$ or $SnO_x$ ($0<x<2$), and contains at least one metal or semimetal in addition to the above-mentioned first metal or first semimetal. As an additive, the metal or semimetal is effective in achieving, with regard to laser light, high absorptance and thermal conductivity of the film, thereby improving the characteristic of rapid cooling from a high temperature state. To facilitate vacuum evaporation and to reduce the crystal size of the first metal or semimetal to as small a size as possible, at least one of such metals as Sn, In, Bi, Zn or Se or such semimetals as Te, Ge or Sb is especially effective.

In the following description, the metals and semimetals, all inclusive, are referred to as metals for simplicity.

On the information recording thin film 2, a protection film 3 is formed. As has been described, the optical information recording thin film in accordance with the present invention can record information without changing the shape of the thin film, and therefore, a protection layer of a type tightly contacting the thin film can be used, depending on the purpose of its usage. Such a protection layer can be formed by bonding a photo-polymerized resin layer of the same type as that of the substrate 1, formed by bonding on the information recording thin film, or alternatively, the protection layer can be formed by vapor evaporation.

Next, the method of forming the information recording thin film 2 is described. The information recording thin film 2 is formed on the substrate 1 by a vacuum evaporation method or a sputtering method. Using the vacuum evaporation method, a multi-source vacuum evaporation method using independent vacuum evaporation sources of metal(s) or metal oxide(s) contained in a metal oxide composition constituting the host material are prepared, along with other individual evaporation sources of metal(s) to be added as additive(s). Then, by selecting the speeds of the vacuum evaporations from the various evaporation sources in desired ways, an information recording thin film of a desired composition is obtained.

As an alternative method, a mixture of the various materials are filled in a single vacuum evaporation source and the vacuum evaporation is carried out from the single source.

Figure 2:
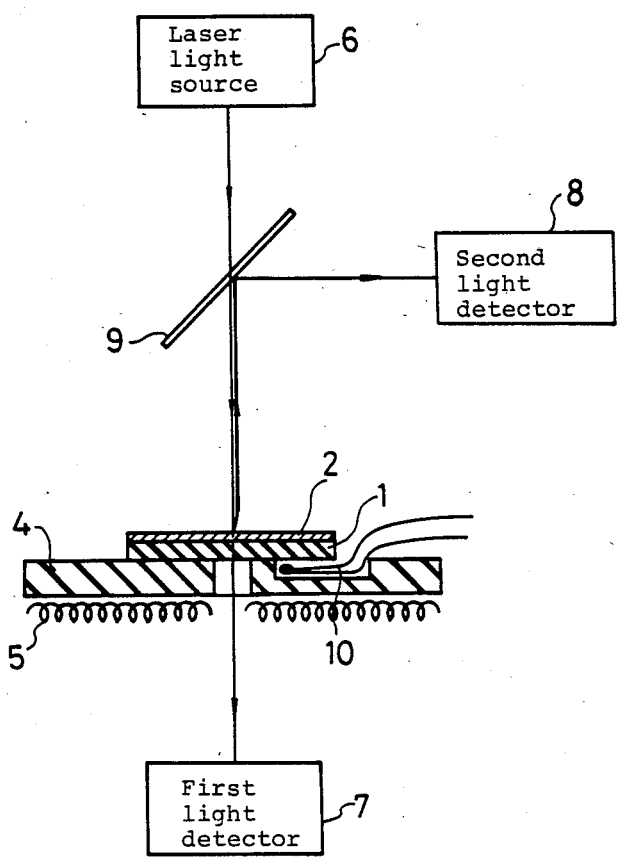
FIG. 2 is a schematic diagram showing an arrangement for measurement of the thermal transition temperature of the information recording medium.
Figure 3:
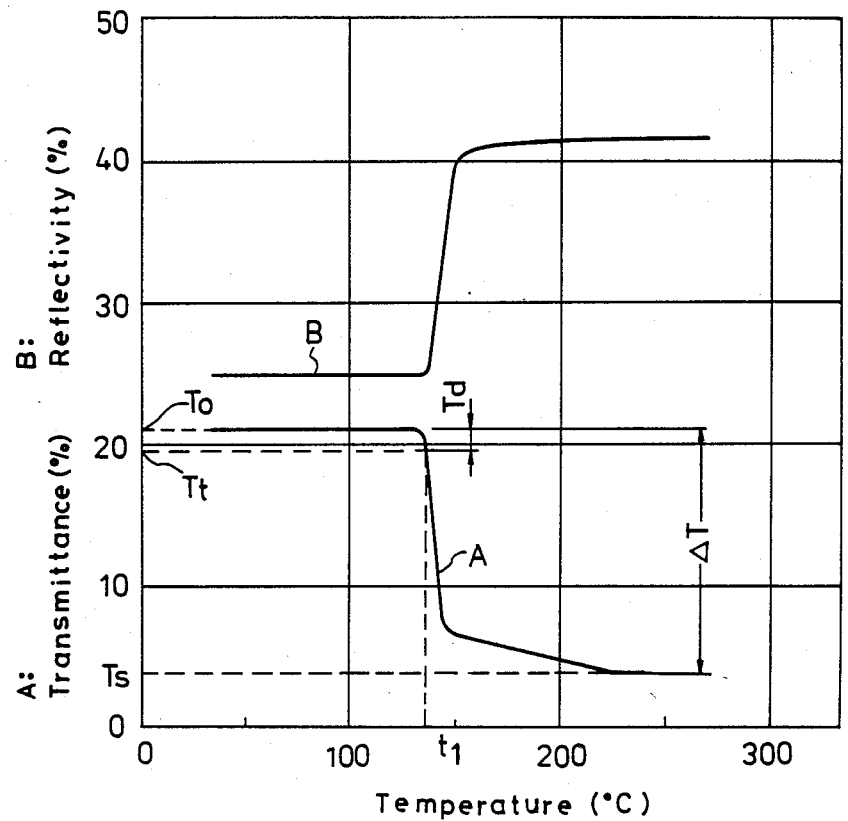
FIG. 3 is a graph showing one example of measurement of the thermal transition temperature.

Next, the measurement of the transition temperature of the information recording thin film is described in detail. FIG. 2 shows a suitable arrangement for the measurement of the thermal transition temperature of the information recording medium. The information recording medium comprising the information recording thin film 2 provided on the substrate 1 is put on a heating table 4. The heating table 4 is heated by a heater 5 provided thereunder. Laser light from a laser light source 6 is irradiated through a half mirror 9 onto the information recording thin film 2 and some part of the laser light passes through the thin film 2 and the substrate 1 and enters a first light detector 7. Light reflected by the information recording thin film 2, after reflection by the half mirror 9, enters a second light detector 8. The heating table has a thermocouple 10 for detecting its temperature. The transmittance and reflectivity of the information recording thin film 2 is measured by gradually raising the temperature of the substrate 1 by gradually increasing the heating current in the heater 5, using the thermo-couple 10 to monitor the temperature. Thus, a graph having a temperature-transmittance curve A and a temperature-reflectivity curve B as shown in FIG. 3 is obtained, and therefrom, there can be identified a first type of transition temperature, $t_1$, i.e. an initial darkening temperature which is the temperature at which darkening begins, and which temperature is specific to the individual information recording thin film.

The definition of the transition temperatures is set forth below:

Providing that:

The temperature rise rate is 1° C/sec, the transmittance before heating is $T_0$, the transmittance at the minimum change rate of the transmittance after the temperature rise is $T_s$, and the transition temperature, $t_1$, is defined as a minimum temperature in a temperature-transmittance curve passing a thermal transition transmittance, $T_t$, which is defined as $$T_t = T_0 - \frac{T_0 - T_s}{10}.$$

Figure 4:
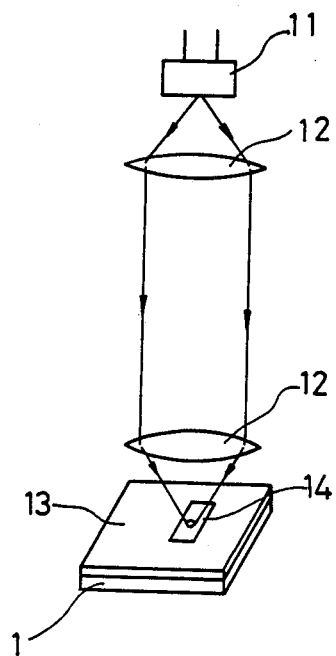
FIG. 4 is a schematic view showing an arrangement for whitening the information recording medium which has been treated once to the darkened state.

Next, in order to measure the second type of transition temperature, i.e. the re-darkening temperature, $t_2$, which is the transition temperature from the whitened state to the darkened state, there must be formed a whitened portion on the erasable information recording thin film. A method of forming the whitened part is illustrated in FIG. 4. As shown in FIG. 4, the light of a pulse-driven type large power semiconductor laser 11, which has a large radiation area of 200 μm ×2 μm, a high power of 10 W, a lasing period of 200 n sec and a repetition frequency of 100 Hz, is focused on a small spot on a preliminarily darkened information recording film 13 by means of convergence lenses 12, 12, so that the irradiated portion is instantly heated above the melting temperature of the erasable information recording film, and thereafter, the substrate 1 is moved thereby to rapidly cool the irradiated portion. Thus, a whitened portion 14 having a larger area than the beam width of a monitor light is obtained. with respect to the thus-obtained whitened portion, the re-darkening temperature, $t_2$, can be measured in a manner similar to the measurement of the initial darkening temperature, $t_1$, as described with reference to FIG. 2.

The above-mentioned initial darkening temperature and the re-darkening temperature are not generally identical. This is due to the difference between the internal structure of the thin film in the initial state and the internal structure of the thin film in the whitened state, as described below. The recording state, e.g. the whitened state, is realized by instantly melting the information recording thin film by irradiating it with a relatively strong laser light and rapidly cooling the thin film thereafter, in order to freeze it in a random state. The cooling rate of the whitening treatment is very much higher than the cooling rate of the initial cooling during the process of forming the erasable information recording thin film, wherein the material compound particles are cooled from the gas phase to the solid state phase, and in the whitened thin film, the grains of metal, such as Te, are considered to be frozen in a random or disordered state wherein the grain size is very small.

Table 1 below shows the relationships between the compositions of the information recording thin films formed using the multi-source vacuum deposition method and their transition temperatures. The composition values of the information recording thin films shown in the Table are measured by Auger electron spectroscopy. Of the transition temperatures, the initial darkening temperature, $t_1$, is the temperature at which the information recording thin film makes the transition from the initial state, which is immediately after the vacuum evaporation for forming to the darkened state; and the redarkening temperature, $t_2$, is a temperature of a second transition to a second darkened state in a series of operations such that the thin film is first darkened by annealing once for 5 minutes at 400° C. from the initial state, then is whitened by using the apparatus shown in and described with reference to FIG. 4, and thereafter is darkened a second time with a gradual rise in temperature. As shown in Table 1, the transition temperatures, $t_1$ and $t_2$, differ with respect to the initial darkening temperature and the re-darkening temperature states, and further, the transition temperatures vary depending on the compositions of the erasable information recording thin film.

TABLE 1

| Composition of the Erasable Information Recording Thin Film | Initial Darkening Temperature ($t_1$) | Re-darkening Temperature ($t_2$) |
| --- | --- | --- |
| $Te_{81}Sn_5O_{14}$ | 90° C. | — |
| $Te_{65}Sn_7O_{28}$ | 120° C. | 85° C. |
| $Te_{68}Ge_2Sn_{10}O_{20}$ | 130° C. | 110° C. |

TABLE 1-continued

| Composition of the Erasable Information Recording Thin Film | Initial Darkening Temperature ($t_1$) | Re-darkening Temperature ($t_2$) |
| --- | --- | --- |
| $Te_{73}Ge_5Sn_{10}O_{14}$ | 135° C. | 125° C. |
| $Te_{59}Ge_{10}Sn_{13}O_{18}$ | 180° C. | 160° C. |
| $Te_{62}Ge_6Sn_{10}O_{22}$ | 155° C. | 130° C. |
| $Te_{80}Ge_2Sn_7O_{11}$ | 115° C. | 100° C. |
| $Te_{67}Ge_3O_{30}$ | 140° C. | 115° C. |
| $Te_{70}Ge_4O_{26}$ | 140° C. | 125° C. |
| $Te_{65}Se_{10}O_{25}$ | 140° C. | 125° C. |
| $Te_{62}In_{12}O_{26}$ | 125° C. | 120° C. |
| $Te_{60}Ge_9Sn_9Se_7O_{18}$ | 150° C. | 170° C. |
| $Te_{65}Ge_5Sn_6Au_8O_{16}$ | 155° C. | 130° C. |
| $Te_{67}Ge_5Se_{11}Au_5O_{12}$ | 160° C. | 120° C. |

Figure 5:
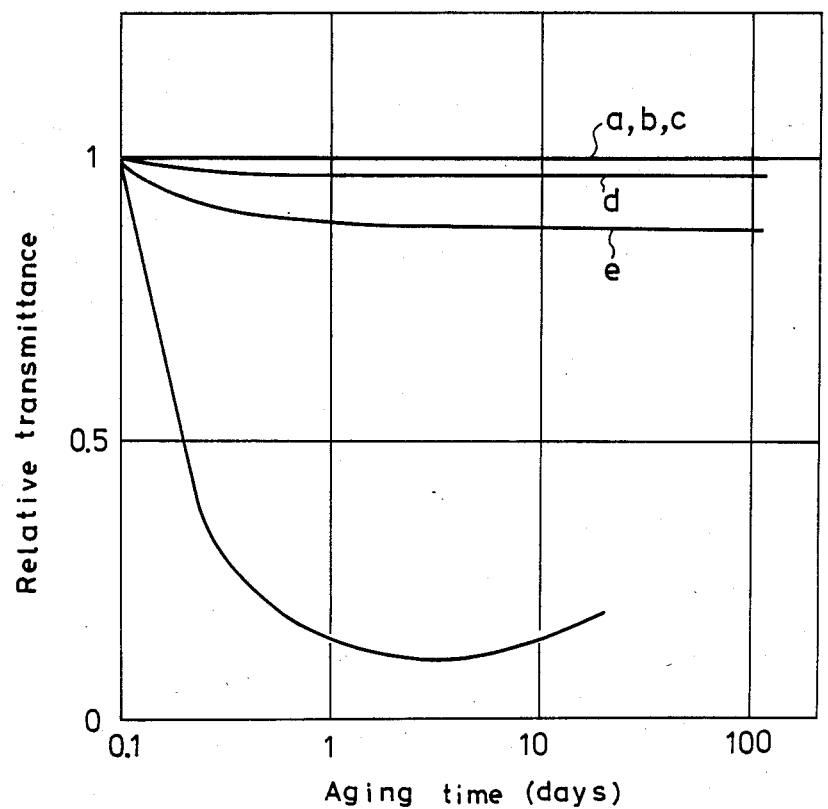
FIG. 5, FIG. 6 and FIG. 7 are graphs showing the relation between the transition temperatures and the reliability of the information recording medium of the embodiment.

FIG. 5 shows the results of reliability tests of a non-erasable information recording thin film of conventional $TeO_x$ ($0 < x < 2$). In the test, the recording atmosphere is 50° C. dry air and the curves "a", "b", "c", "d", "e" and "f" show the characteristics of aging time vs. relative transmittance for information recording thin films having the following initial darkening temperatures:

a ... 120° C.
b ... 135° C.
c ... 175° C.
d ... 115° C.
e ... 110° C.
f ... 85° C.

The curves show that the information recording thin film of the non-erasable type having a transition temperature above 120° C. does not substantially deteriorate in a lengthy recording.

Figure 6:
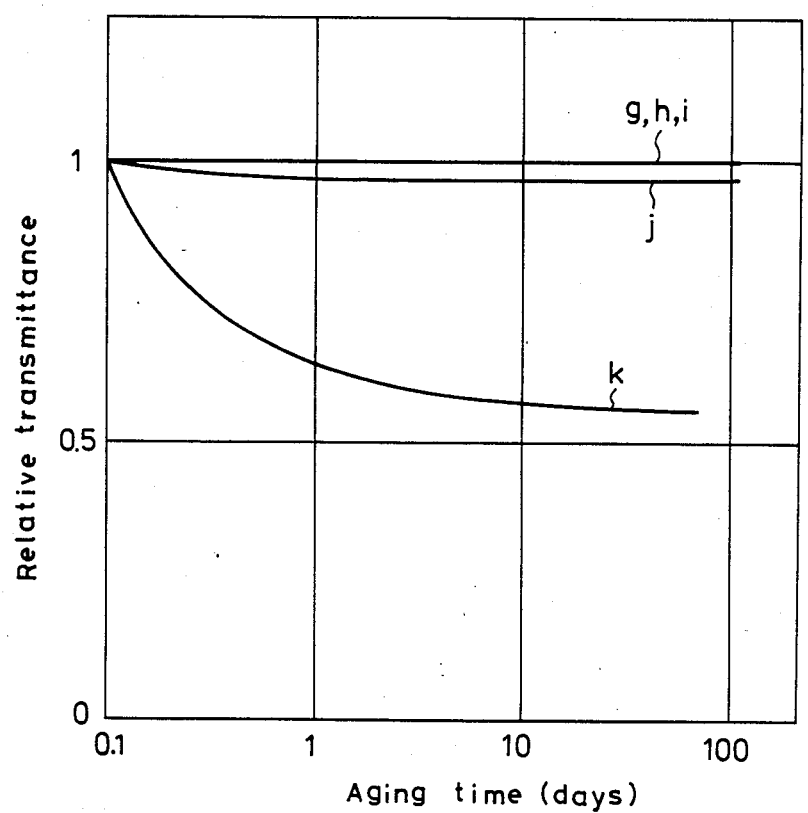
Figure 7:
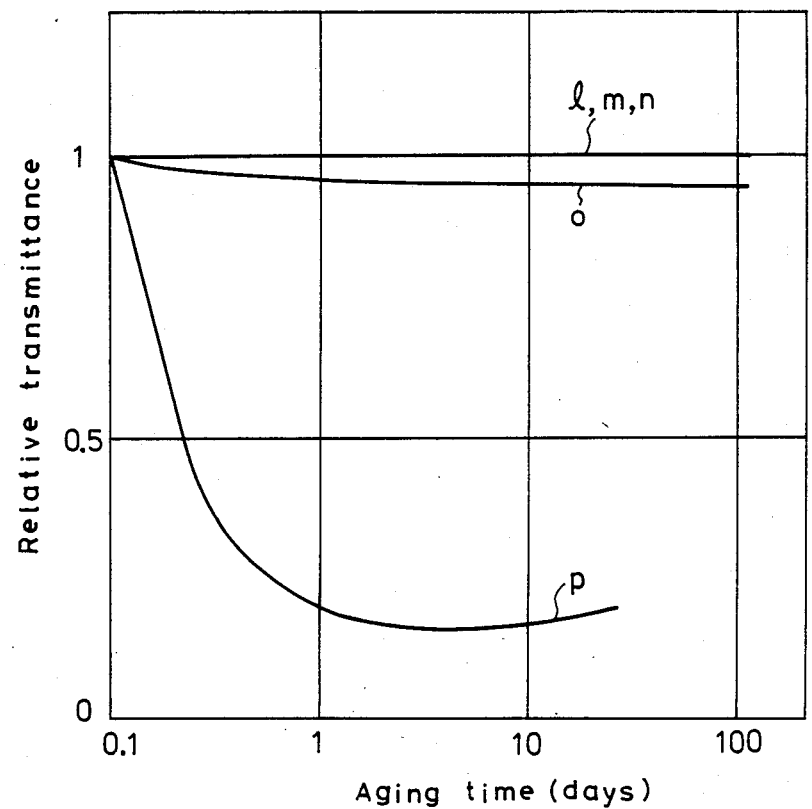

Graphs of FIG. 6 and FIG. 7 show characteristic curves of reliability tests of information recording thin film of the erasable type having $TeO_x$ ($0 < x < 2$) as the host material and also containing at least one of Ge or Sn, made in the same recording atmosphere as the above-mentioned tests. FIG. 6 shows the results of the reliability tests of the initial state, that is, the curves "g", "h", "i", "j" and "k" show the characteristics of the information recording thin films of compositions having the following initial darkening temperatures:

g ... 120° C.
h ... 130° C.
i ... 180° C.
j ... 115° C.
k ... 90° C.

FIG. 7 shows the characteristic curves of reliability tests of information recording thin films which are made by annealing once for 5 minutes at 400° C. to the darkened state and further whitened by using the apparatus of FIG. 4. The curves "l", "m", "n", "o" and "p" show the characteristics of the information recording thin film of compositions having the following redarkening temperatures:

l ... 125° C.
m ... 130° C.
n ... 160° C.
o ... 110° C.
p ... 85° C.

The above-mentioned results of FIG. 6 and FIG. 7 also show that for the erasable type information recording apparatus, when the initial darkening temperatures and re-darkening temperatures are above 100° C., the deterioration rates of transmittance after 100 hours of recording are within 10%, which deterioration value is practically admissible as stable information recording media. Furthermore, when the initial darkening temperatures and re-darkening temperatures are above 120° C., there is substantially no deterioration of transmittance, and the media can show sufficient stability under severe conditions of use.

As mentioned above, in the erasable type optical information recording media, such as the disc type optical information recording system, the darkened state is used as the non-recorded state or the erased state, and the whitened state is used as the recording portions of the signal. Accordingly, the stability of the recorded signal, namely, the stability of the whitened state, depends on the aforementioned re-darkening temperature. Therefore, for erasable optical information recording media having a thin film, a re-darkening temperature of above 100° C. is necessary to achieve a practically stable and long life optical information recording.

The inventors' intensive experimental research shows that in addition to the abovementioned erasable information recording thin film material having a Te-Ge-Sn-O composition, other such compositions of erasable information recording media as the Te-Ge-O type, Te-Se-O type, Te-IN-O type, Te-Ge-Sn-Se-O type, Te-Ge-Sn-Au-O type or Te-Ge-Se-Au-O type also show excellent stabilities when their composition has a redarkening temperature of above 100° C.

What is claimed is:

1. A method of measuring reliability of an information recording medium which comprises an information recording thin film which is formed by a substance having a state of high optical density when it is heated substantially to its darkening temperature and thereafter is slowly cooled and a state of low optical density when it is heated substantially to said melting point and thereafter is rapidly cooled, which method comprises the steps of:
   heating said film at least once to its melting point,
   rapidly cooling said film after heating,
   measuring a transition temperature of said film after cooling, and
   comparing said transition temperature with a predetermined reference temperature.

2. A method of measuring reliability of an information recording medium in accordance with claim 1, wherein
   said heating step is accomplished by irradiation of a pulsed laser light of a narrow pulse-width which is focused on said information recording thin film, and termination of said irradiation initiates said rapidly cooling step.

3. A method of measuring reliability of an information recording medium in accordance with claim 1, wherein
   measurement of said transition temperature comprises the steps of:
   heating said information recording film under a constant temperature-rise-rate, and
   measuring continuously the optical density of said information recording film during said heating step.

4. A method of measuring reliability of an information recording medium which comprises an information recording thin film which is formed by a substance having a state of high optical density when it is heated substantially to its darkening temperature and thereafter is slowly cooled and a state of low optical density when it is heated substantially to said melting point and thereafter is rapidly cooled, which method comprises the steps of:
   annealing said film by heating to a temperature which is lower than said melting point for a predetermined time period for changing a low optical density state of said film to a high optical density state,
   heating a part of said film at least once to its melting point,
   rapidly cooling said part of said film after heating,
   measuring a transition temperature of said film after cooling, and
   comparing said transition temperature with a predetermined reference temperature.

* * * * *